(12) United States Patent
Tonelli et al.

(10) Patent No.: US 8,789,457 B2
(45) Date of Patent: Jul. 29, 2014

(54) HOLDER FOR CUPS OR OTHER CONTAINERS IN MACHINES FOR PREPARING BEVERAGES

(75) Inventors: Stefano Tonelli, Bologna (IT); Cristiano Castelli, Bologna (IT)

(73) Assignee: Koninklijke Philips N.V., Eindhoven (NL)

( * ) Notice: Subject to any disclaimer, the term of this patent is extended or adjusted under 35 U.S.C. 154(b) by 866 days.

(21) Appl. No.: 12/670,170

(22) PCT Filed: Jul. 18, 2008

(86) PCT No.: PCT/IT2008/000488
§ 371 (c)(1),
(2), (4) Date: May 13, 2010

(87) PCT Pub. No.: WO2009/013778
PCT Pub. Date: Jan. 29, 2009

(65) Prior Publication Data
US 2011/0023722 A1 Feb. 3, 2011

(30) Foreign Application Priority Data

Jul. 24, 2007 (IT) ................. FI2007A0172

(51) Int. Cl.
*A47J 31/00* (2006.01)
*B67D 1/08* (2006.01)

(52) U.S. Cl.
USPC .............. 99/275; 99/323.3; 99/446; 222/108; 210/248

(58) Field of Classification Search
CPC .............. A47J 31/4428; A47J 31/4425; A47J 31/4403; A47J 31/44; B67D 1/16; B67D 1/06
USPC ......... 99/275, 279, 446, 444, 323.3; 222/108, 222/109, 110, 111; 55/511, DIG. 6; 403/DIG. 1; 141/88, 86, 87; 210/248, 210/198.1
See application file for complete search history.

(56) References Cited

U.S. PATENT DOCUMENTS

| 2,598,665 | A | * | 6/1952 | Levings | ........................... 141/88 |
| 5,113,751 | A | | 5/1992 | Holcomb et al. | |
| 5,525,145 | A | * | 6/1996 | Hodge | ............................... 96/17 |
| 6,462,312 | B1 | | 10/2002 | Feagley | |
| 7,575,617 | B2 | * | 8/2009 | Ferguson | ........................ 55/480 |
| 2003/0034359 | A1 | * | 2/2003 | Lassota | ...................... 222/185.1 |
| 2005/0279689 | A1 | * | 12/2005 | Oranski et al. | ............. 210/198.1 |
| 2012/0000933 | A1 | * | 1/2012 | Cahen et al. | ................... 222/108 |

FOREIGN PATENT DOCUMENTS

| CN | 2179729 Y | 10/1994 |
| EP | 1731065 A1 | 12/2006 |
| FR | 2 440 720 | 6/1980 |
| JP | 0342888 B2 | 6/1991 |
| JP | 2000 033045 | 2/2000 |
| JP | 2004154470 A | 6/2004 |
| RU | 2424139 C1 | 7/2011 |
| WO | WO 2006/084810 | 8/2006 |

* cited by examiner

*Primary Examiner* — Reginald L Alexander

(57) ABSTRACT

A holder includes a grid and a tray below to collect any liquids flowing through the grid. The grid and the tray are mutually constrained magnetically.

16 Claims, 3 Drawing Sheets

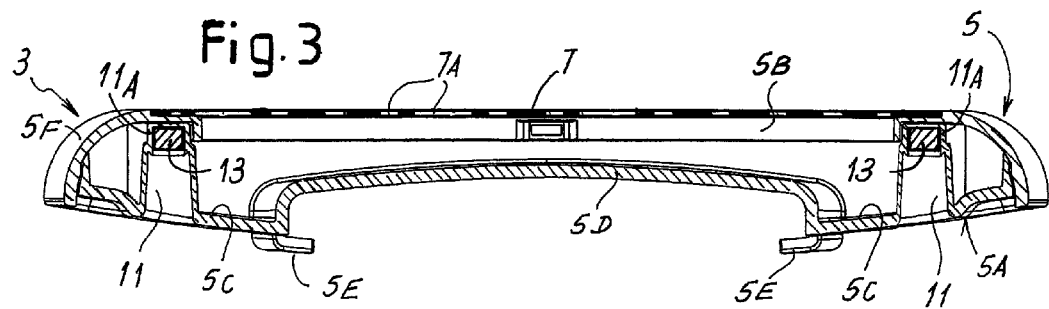
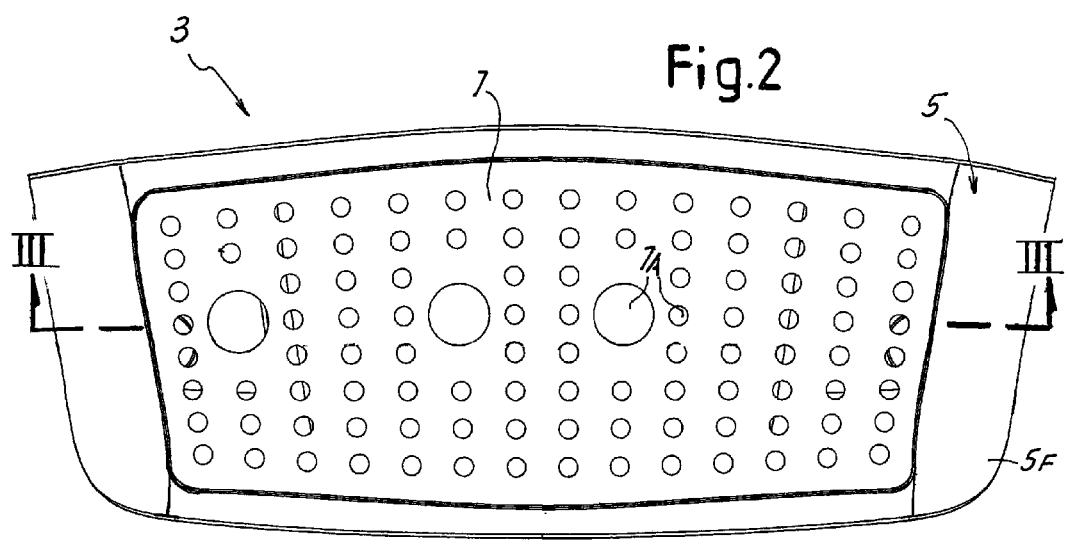

HOLDER FOR CUPS OR OTHER CONTAINERS IN MACHINES FOR PREPARING BEVERAGES

TECHNICAL FIELD

The present invention relates to improvements to machines for preparing beverages and in particular for preparing coffee. In particular, the present invention relates to improvements to holders for cups or other containers utilized in coffee machines or other machines for preparing beverages in general.

STATE OF THE ART

Hereunder, specific reference will be made to coffee machines, but it must be understood that the characteristics of the present invention can also be employed usefully in other types of machines for preparing beverages.

Machines for preparing coffee, whether automatic, semi-automatic or manual, comprise a holder for cups or other containers to contain coffee, arranaged under the coffee dispensing spout or spouts. These holders usually comprise a tray to collect water or other liquids dispensed from the dispensing spout of the machine, such as the water that is delivered from the machine during heating, or drops of coffee or other beverages that fall after having removed the cup or cups from the holder. Above the tray a grid is arranged, on which cups or other containers are placed. In the context of the present description and of the appended claims, grid is intended as any member forming a supporting surface and presenting openings suitable to allow the liquid to pass through toward the tray below.

In some cases the grid is simply resting on the tray. In other cases the grid interlocks on the tray. When the machine requires to be cleaned, the support comprising the tray and the grid must be removed from the machine and the tray must be separated from the grid. In some cases, the tray must be removed just to empty the water or other liquid residues that have accumulated therein. In this case, if the grid is not interlocked on the tray, it falls and therefore, to avoid accidental breakage, must be removed before emptying the tray.

Vice versa, when the grid is interlocked on the tray, in some cases it can be difficult to remove the grid prior to the cleaning operations.

SUMMARY OF THE INVENTION

According to one aspect, the invention provides for a holder for containers to collect beverages, in the machine for preparing beverages such as coffee machines or the like, which entirely or partly alleviates the drawbacks of prior art holders.

The object of one embodiment of the invention is to provide a holder with a grid and a tray, easily detachable from each other, which nonetheless offer a high degree of stability when coupled and sufficient mechanical strength of the grid.

In substance, in one embodiment the invention provides for a holder for containers to collect beverages in a machine for preparing beverages, comprising a grid and a tray arranged underneath, to collect any liquids flowing through said grid, wherein said grid and said tray are mutually constrained magnetically.

The invention also relates to a machine for preparing beverages, in particular but not exclusively a machine for preparing coffee, comprising at least one beverage dispensing spout and, under said at least one dispensing spout, a holder as defined above.

BRIEF DESCRIPTION OF THE DRAWINGS

The invention will be better understood by following the description and accompanying drawings, which show a non-limiting practical embodiment of the invention. More in particular, in the drawing:

FIG. 2 shows a plan view of the assembled holder;

FIG. 3 shows a section according to of FIG. 2;

DETAILED DESCRIPTION OF AN EMBODIMENT OF THE INVENTION

Figure 4:
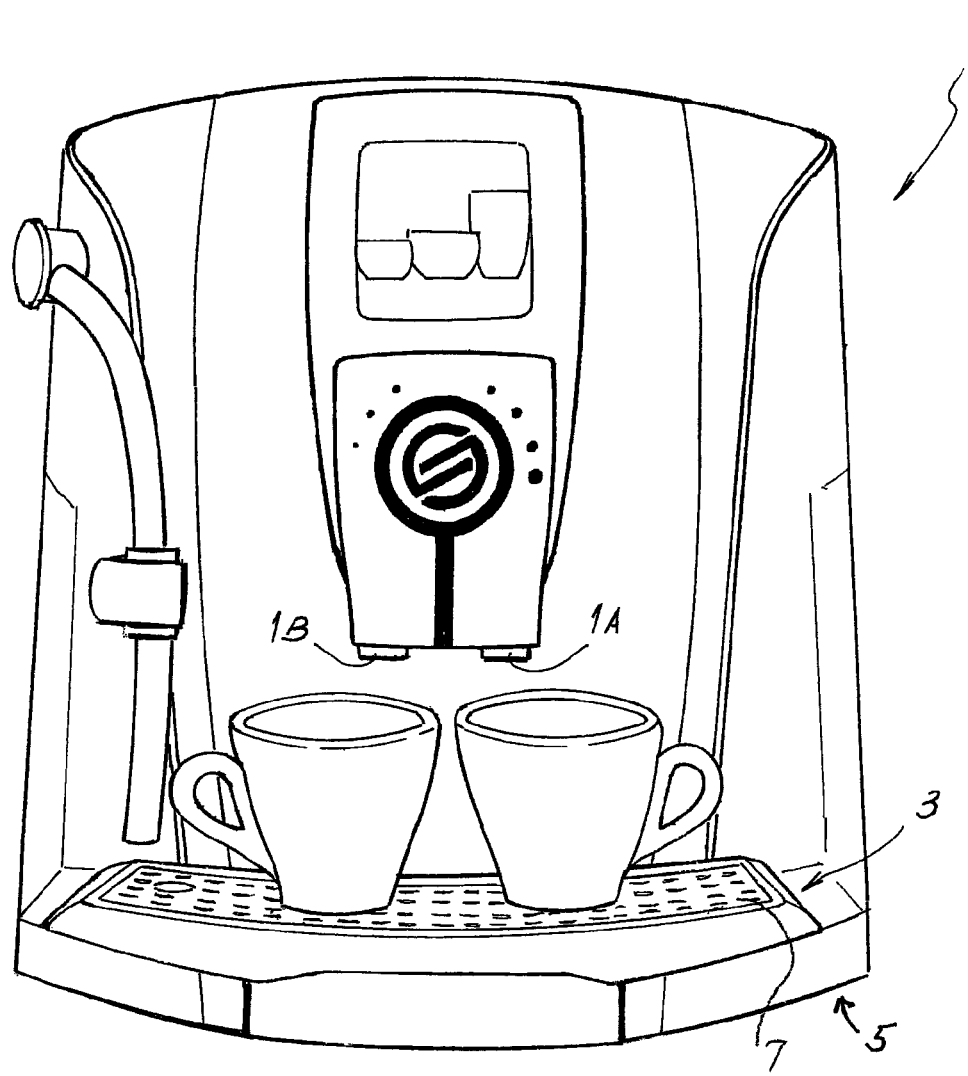
FIG. 4 shows the view of a coffee machine comprising the holder of FIGS. 1 to 3.

FIG. 4 shows a coffee machine indicated as a whole with 1, equipped with a pair of dispensing spouts 1A and 1B. Under the dispensing spouts a holder is arranged, which is indicated as a whole with 3 and forms a supporting surface for the cups or other containers that must be placed under the dispensing spouts 1A, 1B. The holder 3 is completely removable from the machine to allow washing thereof.

Figure 1:
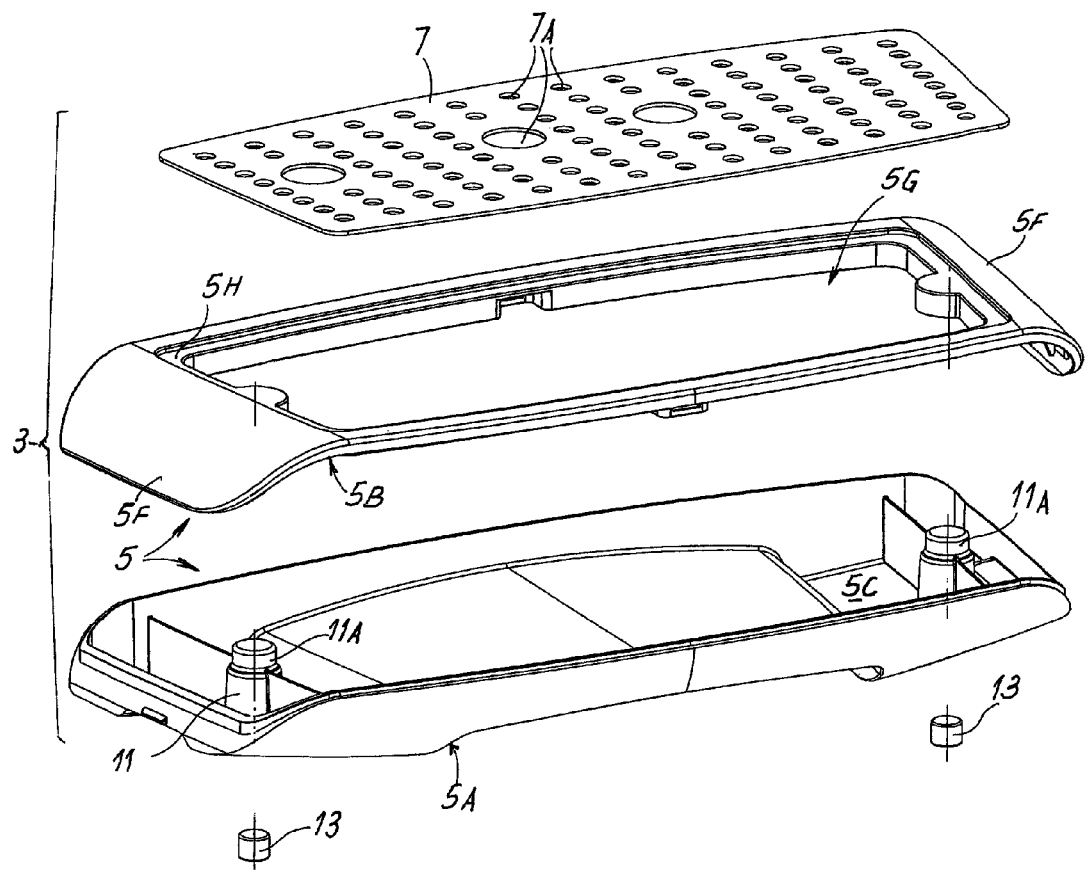
FIG. 1 shows an exploded view of the holder in one embodiment of the invention.

FIGS. 1 to 3 show in detail the structure of the holder 3 in one embodiment of the invention.

In the embodiment shown, the holder 3 comprises a tray 5 arranged under a grid 7 equipped with holes or openings 7A which, in the example shown, are circular in shape, but which can be of any shape also as a function of aesthetic requirements of the machine 1.

In one embodiment of the invention, the tray 5 is made of molded plastic material, while the grid 7 is made of ferromagnetic material. In a different embodiment, the grid can be made of magnetic material and the tray can comprise ferromagnetic or magnetic parts, applied thereon, incorporated therein or in any case constrained to the tray.

In the embodiment shown the tray 5 comprises a lower portion 5A forming the volume to collect the liquid that can be delivered from the dispensing spouts 1A, 1B. In the embodiment shown, the lower portion 5A presents a shaped bottom with two side areas 5C of greater depth to collect the liquid and a raised intermediate portion 5D, under which projections 5E are located, for example designed so as to insert the tray 5 in guide elements integral with the machine 1, so that the holder 3 remains stably coupled to the machine during use. In one embodiment, the bottom 5D is curved to facilitate draining of the liquid toward the side areas 5C.

Above the lower portion 5A of the tray 5 there is located an upper portion 5B designed approximately in the shape of a frame with two side projections 5F that close the side areas of the lower portion 5A of the tray 5. The central part of the upper portion 5B has a wide aperture 5G of a shape corresponding approximately to the shape of the grid 7 and surrounded by a perimeter seat 5H into which the edge of the grid 7 is inserted so as to be housed on the upper portion 5B of the tray 5.

In the side areas of the lower portion 5A of the tray 5 two seats 11 are provided that are open at the bottom and internally hollow, produced for example through molding together with the remaining part of the lower portion 5A of the tray 5. These seats extend from the bottom of the tray toward the upper portion 5B thereof and define therein approximately cylindrical housings 11A in which permanent magnets 13 are inserted. These magnets can advantageously be pellet shaped, although it would also be possible for both seats 11 and magnets 13 to present different shapes, e.g. cubic, prismatic or the like. As can be seen in particular in the section of FIG. 3, when the holder 3 is assembled, as a result of their position the permanent magnets 13 exert a force of attraction through the thicknesses of plastic material defining the upper part of the respective seats 11 and the upper portion 5B of the tray 5, holding the grid 7, made of ferromagnetic or magnetic material, in position through magnetic force.

The attraction is such that not only the grid 7 remains in its seat delimited by the edge 5H of the upper portion 5B of the tray 5, but said portion 5B is held with sufficient force on the lower portion 5A of the tray 5. In this way, a stable coupling is obtained between grid 7 and tray 5 and between the portions 5A, 5B.

When it is necessary to empty the liquid that has accumulated in the tray 5, it is sufficient to remove the support 3 from the machine 1, hold it over a sink and tip it to empty the liquid through the openings 7A of the grid 7. The latter remains firmly engaged with the portions 5A, 5B of the tray 5.

However, when wishing to wash the grid 7 and the tray 5, the user can easily remove the holder 3 and mutually detach the parts 5A, 5B and 7 of which it is composed, for example to place them in a dishwasher.

The permanent magnets 13 can advantageously be incorporated during molding in the plastic material with which the lower portion 5A of the tray 5 is formed, so that these magnets are not lost. It would also be possible for the magnets to be embedded in a subsequent assembling stage, after molding of the lower portion 5A of the tray. In one embodiment the magnets can be glued or fastened in any other way inside their seats 11, 11A.

In a modified embodiment the elements 13 can be composed of simple inserts made of ferromagnetic material, while the grid 7 can possess magnetic characteristics. In other embodiments both the elements 13 and the grid 7 can be made of magnetic material. In a modified embodiment, not shown, magnetic attraction between the grid 7 and the tray 5, and more in particular the lower portion 5A thereof, can be obtained by magnetizing the material with which the lower portion 5A of the tray 5 is produced, or by incorporating a magnetic powder into the plastic material with which the tray is molded, or said tray can be manufactured incorporating therein a ferromagnetic material, for example iron fillings or other ferromagnetic material distributed in the volume of the plastic material forming the tray, while the grid 7 is made of magnetized material or is stably coupled to magnetized material, for example constrained to permanent magnets.

In some embodiments, several magnets can be provided along the perimeter extension of the grid 7.

What is important in any case is that a reciprocal magnetic attraction is exerted between the grid 7 and the lower portion of the tray 5, which stabilizes the various components of the holder 3 when assembled.

In a modified embodiment, not shown, the grid 7 could be fitted directly on a lower tray produced in one piece, instead of in two portions 5A, 5B as shown in the drawing. In this case it would be possible, for example, to place the permanent magnets 13 along the edge of the tray, in two opposed positions or even in several positions along the perimeter extension of the tray. The tray can, for example, be produced with a perimeter seat against which the perimeter edge of the grid 7 engages.

In some modified embodiment, the tray can be made of metallic, magnetic or ferromagnetic material, instead of plastic.

It is understood that the drawing shows just one example, provided merely as a practical demonstration of the invention, which can vary in its forms and arrangements, without however departing from the scope of the idea underlying the invention. Any reference numbers in the appended claims are provided to facilitate reading of the claims with reference to the description and to the drawing, and do not limit the scope of protection represented by the claims.

The invention claimed is:

1. A holder for containers to collect beverages in a machine for preparing beverages, the holder comprising:
   a grid; and
   a tray below said grid to collect any liquids that flow through said grid,
   wherein said grid and said tray are mutually constrained magnetically by a magnet,
   wherein said tray comprises a lower portion forming bottom of the tray and defining a volume to collect the liquid, and an upper portion, applicable to the lower portion and defining a seat for said grid, and
   wherein the lower portion includes a housing having an open bottom, the magnet being insertable through the open bottom of the housing to reach a top of the housing near the grid for magnetically holding the grid.

2. The holder as claimed in claim 1, wherein said grid is made of magnetic, paramagnetic or ferromagnetic material.

3. The holder as claimed in claim 1, wherein said tray is made of plastic material.

4. The holder as claimed in claim 3, wherein the magnet is incorporated in the plastic material forming said tray.

5. The holder as claimed in claim 1, wherein said tray is formed at least partly of magnetic, paramagnetic or ferromagnetic material.

6. The holder as claimed in claim 1, wherein said upper portion is held between the grid and the lower portion of the tray via a force of magnetic attraction that couples said grid and said lower portion of the tray.

7. The holder of claim 1, wherein the lower portion of the tray has a shaped bottom with two side parts of greater depth than a raised intermediate portion, wherein the raised intermediate portion is curved downwards from a center of the raised intermediate portion towards the two side parts.

8. The holder of claim 7, further comprising projections projecting from end portions of the raised intermediate portion, the projections being configured for insertion into guides of the machine so that the holder remains stably coupled to the machine, wherein the two side parts extend away from ends of the raised intermediate portion in a first direction, and the projections extend away from ends of the raised intermediate portion in a second direction which is opposite the first direction.

9. A machine for preparing beverages comprising:
   at least one beverage dispensing spout; and
   a holder arranged under said at least one dispensing spout, said holder comprising a grid and a tray below said grid to collect any liquids that flow through said grid,
   wherein said grid and said tray are mutually constrained magnetically by a magnet, and
   wherein said tray comprises a lower portion forming a bottom of the tray and defining a volume to collect the liquid, and an upper portion, applicable to the lower portion and defining a seat for said grid, and
   wherein the lower portion includes a housing having an open bottom, the magnet being insertable through the open bottom of the housing to reach a top of the housing near the grid for magnetically holding the grid.

10. The machine of claim 9, wherein the lower portion of the tray has a shaped bottom with two side parts of greater depth than a raised intermediate portion, wherein the raised intermediate portion is curved downwards from a center of the raised intermediate portion toward the two side parts.

11. The machine of claim 10, further comprising projections projecting from end portions of the raised intermediate portion, the projections being configured for insertion into guides of the machine so that the holder remains stably coupled to the machine, wherein the two side parts extend away from ends of the raised intermediate portion in a first direction, and the projections extend away from ends of the raised intermediate portion in a second direction which is opposite the first direction.

12. A machine for preparing beverages comprising:
at least one beverage dispensing spout; and
a holder arranged under said at least one dispensing spout, said holder comprising a grid and a tray below said grid to collect any liquids that flow through said grid,
wherein said grid and said tray are mutually constrained magnetically by a magnet,
wherein a lower portion of said tray has a shaped bottom with two side parts of greater depth than a raised intermediate portion, and
wherein at least one of the two side parts includes a housing having an open bottom, the magnet being insertable through the open bottom of the housing to reach a top of the housing near the grid for magnetically holding the grid.

13. The machine of claim 12, further comprising projections projecting from end portions of the raised intermediate portion, the projections being configured for insertion into guides of the machine so that the holder remains stably coupled to the machine.

14. The machine of claim 12, wherein the tray is formed of a plastic material including magnetic powder, and the grid is made of magnetized material.

15. The machine of claim 12, wherein the raised intermediate portion is curved downwards from a center of the raised intermediate portion towards the two side parts.

16. The machine of claim 13, wherein the two side parts extend away from ends of the raised intermediate portion in a first direction, and the projections extend away from ends of the raised intermediate portion in a second direction which is opposite the first direction.

* * * * *